W. B. WALKER AND C. R. H. VISSCHER.
VACUUM VESSEL.
APPLICATION FILED DEC. 21, 1921.
1,421,325.
Patented June 27, 1922.
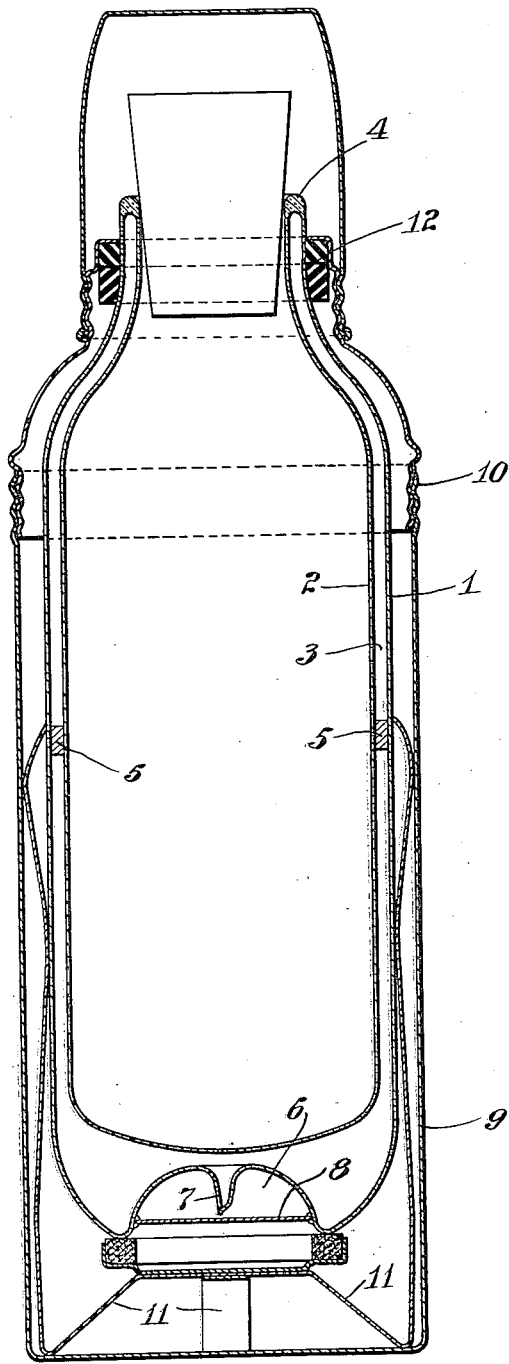
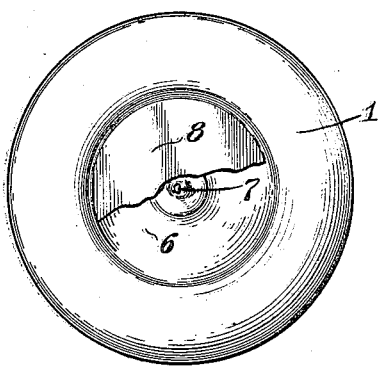
William B. Walker
Charles R. H. Visscher
INVENTOR
BY Robert B Killgore
ATTORNEY

UNITED STATES PATENT OFFICE.

WILLIAM B. WALKER, OF NEW YORK, AND CHARLES R. H. VISSCHER, OF BROOKLYN, NEW YORK, ASSIGNORS TO AMERICAN THERMOS BOTTLE COMPANY, OF NEW YORK, N. Y., A CORPORATION OF MAINE.

VACUUM VESSEL.

1,421,325.  Specification of Letters Patent.  Patented June 27, 1922.

Application filed December 21, 1921. Serial No. 523,938.

*To all whom it may concern:*

Be it known that we, WILLIAM B. WALKER and CHARLES R. H. VISSCHER, citizens of the United States, residing, respectively, in the city, county, and State of New York, and the borough of Brooklyn, New York city, Kings County, New York, have invented certain new and useful Improvements in Vacuum Vessels, of which the following is a full, clear, and exact description.

Our invention relates primarily to the construction of the "filler" or vacuum vessel proper as distinguished from the outer, protecting case and it is our object to so construct this filler that the sealing teat through which the air is exhausted from the vacuum chamber will not project beyond the body of the filler and will be protected against accidental breakage.

Heretofore vacuum vessels have had the sealing teat extending below the bottom, either at the center or the side, or in some cases extending from the shoulder of the outer receptacle. These extending teats are fragile and easily cracked or broken and once cracked or broken the vacuum is destroyed and the vessel rendered useless for the purposes for which it was intended. In many cases the projecting teat has caught against the shock absorber or support within the outer case in placing the filler therein and cracked the filler without the knowledge of the assembler.

We have overcome these difficulties in the manner shown in the accompanying drawing in which Fig. 1 is a sectional view of a vacuum vessel embodying our invention (in an outer case) and Fig. 2 a bottom view of the filler with a protecting plate partly broken away.

The vacuum vessel proper is, at the present time, commercially made of glass and comprises two separated receptacles 1 and 2 connected at their necks 4 and enclosing a vacuum chamber 3 between their walls or bodies. Reinforcing pads 5 of any suitable material may be, but not necessarily are, introduced between the walls to prevent collapse due to atmospheric pressure on the outside walls of the vacuum chamber and to relieve the strain at the neck due to the weight of the contents of the inner receptacle when the vessel is turned on its side to pour out the contents.

The inner faces of the walls of the vacuum chamber are generally, but not necessarily, silvered to seal the pores in the glass and aid in maintaining the vacuum in the chamber and also to reflect light rays which would otherwise pass through the glass and heat the contents.

As before stated in the present type of vacuum vessels in commercial use the sealing teat through which the silvering is introduced into the vacuum chamber and through which the vacuum chamber is exhausted is located at the center or side of the rounded bottom of the outer receptacle and extends beyond it so that it is liable to be broken or cracked unless the vessel is carefully handled.

Our invention is intended to obviate this defect in vacuum vessels and comprises a recess 6 in the outer receptacle 1 with the sealing teat 7 within the recess so that it does not project and the body of the vessel protects the teat against breakage by accidental shocks.

While this recess is shown in the drawing as located in the bottom of the vessel with the sealing teat in the center thereof we do not restrict our invention to any size, shape or location of the recess or the position of the sealing teat within the recess, any recess within which the sealing teat lies coming within its scope.

One advantage of placing the recess at the bottom of the filler is that it permits standing the filler upright when out of the case, an impossibility with the round bottom fillers now in use.

After the vacuum chamber has been silvered and exhausted and the sealing teat closed or pinched off a plate 8 may be cemented over the recess to close it and further protect the sealing teat.

The outer protecting case 9 is generally separable as at 10 and has a support or shock absorber 11 in the bottom to support the filler or vacuum vessel proper out of contact with the case walls. Suitable packing 12 is inserted between the case and filler at the neck to prevent the leakage of liquids into the space between the filler and case.

While we have selected a vacuum bottle for illustration in the drawing our invention is not restricted thereto as it may be used on vacuum jars, jugs, carafes or vessels of any shape.

We claim:—

1. A vacuum vessel comprising separated receptacles connected at their necks and enclosing a vacuum chamber between their bodies, the outer receptacle being recessed and a sealing teat within the recess.

2. A vacuum vessel comprising separated receptacles connected at their necks and enclosing a vacuum chamber between their bodies, the outer receptacle being recessed, a sealing teat within said recess and a plate closing the recess and protecting the teat.

3. A vacuum vessel comprising separated receptacles connected at their necks and enclosing a vacuum chamber between their bodies, the bottom of the outer receptacle being recessed, and a sealing teat within the recess.

4. A vacuum vessel comprising separated receptacles connected at their necks and enclosing a vacuum chamber between their bodies, the bottom of the outer receptacle being recessed, a sealing teat within the recess and a plate closing the recess and protecting the teat.

5. A vacuum vessel comprising separated receptacles connected at their necks and enclosing a vacuum chamber between their bodies, the bottom of the outer receptacle being recessed, a sealing teat within the recess and a plurality of supports interposed between the walls of said receptacles.

6. A vacuum vessel comprising separated receptacles connected at their necks and enclosing a vacuum chamber between their bodies, the bottom of the outer receptacle being recessed, a sealing teat within the recess, a plate closing the recess and protecting the teat and a plurality of supports interposed between the walls of said receptacles.

7. A vacuum vessel comprising separated receptacles connected at their necks and enclosing a vacuum chamber between their bodies, the bottom of the outer receptacle being recessed, a sealing teat within the recess, an outer casing substantially covering the outer surface of said receptacles and means within said casing supporting said receptacles.

8. A vacuum vessel comprising separated receptacles connected at their necks and enclosing a vacuum chamber between their bodies, the bottom of the outer receptacle being recessed, and a centrally located sealing teat within said recess.

9. A vacuum vessel comprising separated receptacles connected at their necks and enclosing a vacuum chamber between their bodies, the bottom of the outer receptacle being recessed, a centrally located sealing teat within said recess and a protecting plate closing said recess.

10. A vacuum vessel comprising separated receptacles connected at their necks and enclosing a vacuum chamber between their bodies, the bottom of the outer receptacle being recessed, a sealing teat within the recess, in combination with an outer casing substantially covering the outer surface of said vessel, a support within said casing supporting the vacuum vessel and sealing means between said casing and vessel at the neck thereof.

WILLIAM B. WALKER.
CHARLES R. H. VISSCHER.